(12) United States Patent
Krohne et al.

(10) Patent No.: US 9,160,408 B2
(45) Date of Patent: Oct. 13, 2015

(54) SYSTEM AND METHOD FOR ESTABLISHING COMMUNICATION WITH AN ARRAY OF INVERTERS

(75) Inventors: Edward Krohne, Austin, TX (US); Brian T. Kuhn, Champaign, IL (US)

(73) Assignee: SunPower Corporation, San Jose, CA (US)

( * ) Notice: Subject to any disclaimer, the term of this patent is extended or adjusted under 35 U.S.C. 154(b) by 633 days.

(21) Appl. No.: 12/902,046

(22) Filed: Oct. 11, 2010

(65) Prior Publication Data

US 2012/0089260 A1  Apr. 12, 2012

(51) Int. Cl.
| | | |
|---|---|---|
| H02J 1/00 | (2006.01) | |
| H02J 3/00 | (2006.01) | |
| H04B 3/54 | (2006.01) | |
| H02J 3/38 | (2006.01) | |
| H02J 13/00 | (2006.01) | |

(52) U.S. Cl.
CPC . *H04B 3/54* (2013.01); *H02J 3/383* (2013.01); *H02J 13/002* (2013.01); *Y02E 10/563* (2013.01); *Y02E 40/72* (2013.01); *Y04S 10/123* (2013.01)

(58) Field of Classification Search
CPC .......................................................... H04B 3/54
USPC .............. 307/1, 3–4, 82; 700/286; 363/71, 95
See application file for complete search history.

(56) References Cited

U.S. PATENT DOCUMENTS

| | | |
|---|---|---|
| 3,670,230 A | 6/1972 | Rooney et al. |
| 4,114,048 A | 9/1978 | Hull |
| 4,217,633 A | 8/1980 | Evans |
| 4,277,692 A | 7/1981 | Small |
| 4,287,465 A | 9/1981 | Godard et al. |
| 4,651,265 A | 3/1987 | Stacey et al. |
| 4,661,758 A | 4/1987 | Whittaker |

(Continued)

FOREIGN PATENT DOCUMENTS

| | | |
|---|---|---|
| CA | 2353422 C | 3/2004 |
| CA | 2655007 A1 | 8/2010 |

(Continued)

OTHER PUBLICATIONS

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

(Continued)

*Primary Examiner* — Rexford Barnie
*Assistant Examiner* — Rasem Mourad
(74) *Attorney, Agent, or Firm* — Barnes & Thornburg LLP (57) ABSTRACT

A system and method for establishing communication between a controller and a plurality of inverters comprises determining a response time window length and broadcasting a response request to the array of inverters that includes the response time window length. Each inverter, in response to receiving the response requests, transmits a response to the controller at a randomly determined response time within the response time window. In response to receiving an acknowledgement from the controller, the responding inverter may ignore subsequent response requests. The controller may adjust the response time window and broadcasts the new response time window until no inverter response is received for a pre-determined number of response time windows.

30 Claims, 5 Drawing Sheets

(56) References Cited

U.S. PATENT DOCUMENTS

| | | |
|---|---|---|
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 5,041,959 A | 8/1991 | Walker |
| 5,148,043 A | 9/1992 | Hirata et al. |
| 5,160,851 A | 11/1992 | McAndrews |
| 5,191,519 A | 3/1993 | Kawakami |
| 5,309,073 A | 5/1994 | Kaneko et al. |
| 5,343,380 A | 8/1994 | Champlin |
| 5,473,528 A | 12/1995 | Hirata |
| 5,668,464 A | 9/1997 | Krein |
| 5,684,385 A | 11/1997 | Guyonneau et al. |
| 5,721,481 A | 2/1998 | Narita et al. |
| 5,745,356 A | 4/1998 | Tassitino |
| 5,796,182 A | 8/1998 | Martin |
| 5,801,519 A | 9/1998 | Midya et al. |
| 5,886,890 A | 3/1999 | Ishida et al. |
| 5,929,537 A | 7/1999 | Glennon |
| 5,978,236 A | 11/1999 | Faberman et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,225,708 B1 | 5/2001 | Furukawa et al. |
| 6,268,559 B1 | 7/2001 | Yamawaki |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 7,031,176 B2 | 4/2006 | Kotsopoulos et al. |
| 7,072,195 B2 | 7/2006 | Xu |
| 7,091,707 B2 | 8/2006 | Cutler |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 | 3/2008 | Jepsen et al. |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,646,116 B2 | 1/2010 | Batarseh et al. |
| 7,660,139 B2 | 2/2010 | Garabandic |
| 7,667,610 B2 | 2/2010 | Thompson |
| 7,693,174 B2 * | 4/2010 | Ishibashi et al. .............. 370/445 |
| 7,710,752 B2 | 5/2010 | West |
| 7,733,679 B2 | 6/2010 | Luger et al. |
| 7,768,155 B2 | 8/2010 | Fornage |
| 7,796,412 B2 | 9/2010 | Fornage |
| RE41,965 E | 11/2010 | West |
| 7,839,022 B2 | 11/2010 | Wolfs |
| 7,855,906 B2 | 12/2010 | Klodowski et al. |
| RE42,039 E | 1/2011 | West et al. |
| 7,899,632 B2 | 3/2011 | Fornage et al. |
| 7,916,505 B2 | 3/2011 | Fornage |
| 8,076,802 B2 * | 12/2011 | Fornage ....................... 307/151 |
| 8,456,877 B2 * | 6/2013 | Angerer et al. ................. 363/95 |
| 2001/0043050 A1 | 11/2001 | Fisher |
| 2002/0017822 A1 | 2/2002 | Umemura et al. |
| 2002/0196026 A1 | 12/2002 | Kimura et al. |
| 2004/0128387 A1 * | 7/2004 | Chin et al. .................... 709/227 |
| 2005/0213272 A1 | 9/2005 | Kobayashi |
| 2006/0067137 A1 | 3/2006 | Udrea |
| 2006/0067222 A1 * | 3/2006 | Endoh .......................... 370/231 |
| 2006/0083039 A1 | 4/2006 | Oliveira |
| 2006/0122857 A1 * | 6/2006 | DeCotiis et al. ................. 705/1 |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0221267 A1 | 9/2007 | Fornage |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 * | 11/2008 | Rotzoll .......................... 363/80 |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242011 A1 | 10/2009 | Proisy et al. |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |
| 2009/0296348 A1 | 12/2009 | Russell et al. |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0138771 A1 * | 6/2010 | Kumar et al. .................. 715/772 |
| 2010/0139945 A1 | 6/2010 | Dargatz |
| 2010/0162256 A1 * | 6/2010 | Branover et al. .............. 718/104 |
| 2010/0175338 A1 | 7/2010 | Garcia Cors |
| 2010/0176771 A1 | 7/2010 | Fieldhouse et al. |
| 2010/0180116 A1 * | 7/2010 | Coan et al. .................... 713/168 |
| 2010/0181830 A1 | 7/2010 | Fornage et al. |
| 2010/0195357 A1 | 8/2010 | Fornage et al. |
| 2010/0195665 A1 * | 8/2010 | Jackson ....................... 370/464 |
| 2010/0214808 A1 | 8/2010 | Rodriguez |
| 2010/0222933 A1 | 9/2010 | Smith et al. |
| 2010/0236612 A1 | 9/2010 | Khajehoddin et al. |
| 2010/0263704 A1 | 10/2010 | Fornage et al. |
| 2010/0283325 A1 | 11/2010 | Marcianesi et al. |
| 2010/0309695 A1 | 12/2010 | Fornage |

(56) References Cited

U.S. PATENT DOCUMENTS

| | | |
|---|---|---|
| 2011/0012429 A1 | 1/2011 | Fornage |
| 2011/0019444 A1 | 1/2011 | Dargatz et al. |
| 2011/0026281 A1 | 2/2011 | Chapman et al. |
| 2011/0026282 A1 | 2/2011 | Chapman et al. |
| 2011/0043160 A1 | 2/2011 | Serban |
| 2011/0049990 A1 | 3/2011 | Amaratunga et al. |
| 2011/0051820 A1 | 3/2011 | Fornage |
| 2011/0130889 A1 | 6/2011 | Khajehoddin et al. |

FOREIGN PATENT DOCUMENTS

| | | |
|---|---|---|
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | 2004008619 A2 | 1/2004 |
| WO | 2004100348 A1 | 11/2004 |
| WO | 2004100348 A8 | 12/2005 |
| WO | WO 2006048688 A1 | 5/2006 |
| WO | WO 2007080429 A2 | 7/2007 |
| WO | WO 2009081205 A2 | 7/2009 |
| WO | WO 2009081205 A3 | 10/2009 |
| WO | 2009134756 A1 | 11/2009 |

OTHER PUBLICATIONS

Bush, "UK Solar Firm Discloses Novel Inverter Topology," ElectronicsWeekly.com. Apr. 2011, last accessed Aug. 30, 2011 at http://www.electronicsweekly.com/Articles/2011/O4/26/50953/UK-solar-firm-discloses-novel-inverter-topology.htm.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved Solar Inverter With Wide Input Voltage Range," IEEE 10th Mediterranean Conference, MEleCon 2000, vol. 2, pp. 810-813, 2000.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.

Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC'09, pp. 1813-1818, 2009.

Khajehoddin et al., "A Novel Topology and Control Strategy for Maximum Power Point Trackers and Multi-string Grid-connected PV Inverters," Applied Power Electronics Conference, APECO8, pp. 173-178, 2008.

Khajehoddin et al., "A Robust Power Decoupler and Maximum Power Point Tracker Topology for a Grid-Connected Photovoltaic System," IEEE Power Electronics Specialists Conference, PESCO8, pp. 66-69, 2008.

Kim et al., "New Control Scheme for AC-DC-AC Converter Without DC Link Electrolytic Capacitor," 24th Annual IEEE Power Electronics Specialists Conference, PESC'93 Record., pp. 300-306, 1993.

Nikraz et al., "Digital Control of a Voltage Source Inverter in Photovoltaic Applications," 35th Annual IEEE Power Electronics Specialists Conference, pp. 3266-3271, 2004.

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 31, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-To-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l Conf. Power Electronics, vol. 1, pp. 559-564, 1996.

Takahashi et al., "Electrolytic Capacitor-Less PWM Inverter," in Proceedings of the IPEC '90, Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

(56) References Cited

OTHER PUBLICATIONS

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.
Wu, et al., "A 1φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.
Wu, et al., "A 1φ 3W Grid-Connection PV Power Inverter with Partial Active Power Filter," IEEE Transactions on Aerospace and Electronic Systems, vol. 39, No. 2, pp. 635-646, Apr. 2003.
Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.
Xue et al., "Topologies of Single-Phase Inverters for Small Distributed Power Generators: An Overview," IEEE Transactions on Power Electronics, vol. 19, No. 5, pp. 1305-1314, 2004.
Kjaer et al., "A Novel Single-Stage Inverter for the AC-module with Reduced Low-Frequency Ripple Penetration," EPE 2003, SBN 90-75815-07-7, 10 pages, 2003.
Kutkut, "PV Energy Conversion and System Integration," Florida Energy Systems Consortium, 2009, 24 pages.
Kwon et al., "High-efficiency Module-integrated Photovoltaic Power Conditioning System," IET Power Electronics, doi:10.1049/iet-pel. 2008.0023, 2008.
Lohner et al., "A New Panel-integratable Inverter Concept for Grid-Connected Photovoltaic Systems," IEEE ISIE '96, vol. 2, pp. 827-831, 1996.
Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.
Martins et al., "Interconnection of a Photovoltaic Panels Array to a Single-Phase Utility Line From a Static Conversion System," Proc. IEEE Power Electronics Specialists Conf., pp. 1207-1211, 2000.
Martins et al., "Usage of the Solar Energy from the Photovoltaic Panels for the Generation of Electrical Energy," The 21st International Telecommunication Energy Conference, 6 pages, 1999.
Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.
Meinhardt et al., "Miniaturised 'low profile' Module Integrated Converter for Photovoltaic Applications with Integrated Magnetic Components," IEEE APEC '99, vol. 1, pp. 305-311, 1999.
Meza et al., "Boost-Buck Inverter Variable Structure Control for Grid-Connected Photovoltaic Systems," IEEE International Symposium on Circuits and Systems, vol. 2, pp. 1318-1321, 2005.
Midya et al., "Dual Switched Mode Power Converter," 15th Annual Conference of IEEE Industrial Electronics Society, vol. 1, pp. 155-158, Mar. 1989.
Midya et al., "Sensorless Current Mode Control—An Observer-Based Technique for DC-DC Converters," IEEE Transactions on Power Electronics, vol. 16, No. 4, pp. 522-526, Jul. 2001.
Ando et al., "Development of Single Phase UPS Having AC Chopper and Active Filter Ability," IEEE International Conference on Industrial Technology, 10.1109/ICIT.2006.372445, pp. 1498-1503, 2006.
Biel et al., "Sliding-Mode Control Design of a Boost-Buck Switching Converter for AC Signal Generation," vol. 51, issue 8, pp. 1539-1551, 2004.
Biel et al., "Sliding-Mode Control of a Single-Phase AC/DC/AC Converter," Proceedings of the 40th IEEE Conference on Decision and Control, vol. 1., pp. 903-907, Dec. 2001.
Bose et al., "Electrolytic Capacitor Elimination in Power Electronic System by High Frequency Filter," Conference Record of the 1991 IEEE Industry Applications Society Annual Meeting, vol. 1, pp. 869-878, 1991.
Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.
Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.
Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.
Brekken, "Utility-Connected Power Converter for Maximizing Power Transfer From a Photovoltaic Source," Thesis Submitted to the Faculty of the Graduate School of the University of Minnesota, Jun. 2002, 56 pages.
Bush, "UK Solar Firm Discloses Novel Inverter Topology," ElectronicsWeekly.com. Apr. 2011, last accessed Aug. 30, 2011 at http://www.electronicsweekly.com/Articles/2011/04/26/50953/UK-solar-firm-discloses-novel-inverter-topology.htm.
Chang et al., "The impact of Switching Strategies on Power Quality for Integral Cycle Controllers," IEEE Transactions on Power Delivery, vol. 18, No. 3, pp. 1073-1078, Jul. 2003.
Chisenga, "Development of a Low Power Photovoltaic Inverter for Connection to the Utility Grid," PhD Thesis, Fitzwilliam College, Cambridge, 173 pages, 2007.
Di Napoli et al., "Multiple-Input DC-DC Power Converter for Power-Row Management in Hybrid Vehicles," Conference Rec. IEEE Industrial Applications Soc. Annual Meeting, pp. 1578-1585, 2002.
Edelmoser, "Improved 2kw Solar inverter With Wide Input Voltage Range," IEEE 10th Mediterranean Conference, MEleCon 2000, vol. 2, pp. 810-813, 2000.
Enphase Energy, "Application Note: Multi-Tenant Design Guidelines," rev. 1, 5 pages, 2008.
Enphase Energy, "Enphase Field Wiring Diagram—M190 & M210 Microinverters—240v, Single Phase," Drawing No. 144-00001, rev. 6, 1 pages, 2009.
Enphase Energy, "Enphase Micro-Inverter Technical Data," Doc. No. 142-00004; rev. 2, 2 pages, 2008.
Esram et al., "Comparison of Photovoltaic Array Maximum Power Point Tracking Techniques," IEEE Transactions on Energy Conversion, vol. 22, No. 2, pp. 439-449, Jun. 2007.
Henze et al., "A Novel AC Module with High Voltage Panels in CIS Technology," 23rd European Photovoltaic Solar Energy Conference, Valencia, Spain, ISBN 3-936338-24-8, 8 pages, Sep. 2008.
Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.
Hung et al., "Analysis and Implementation of a Delay-compensated Deadbeat Current Controller for Solar Inverters," IEEE Proceedings—Circuits, Devices and Systems, pp. 279-286, 2001.
Itoh et al., "Ripple Current Reduction of a Fuel Cell for a Single-Phase isolated Converter using a DC Active Filter with a Center Tap," Twenty-Fourth Annual IEEE Applied Power Electronics Conference and Exposition, APEC '09, pp. 1813-1818, 2009.
Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.
Jeong et al., "An Improved Method for Anti-Islanding by Reactive Power Control," pp. 965-970, 2005.
Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.
Jung et al., "High-frequency DC Link Inverter for Grid-Connected Photovoltaic System," Conference Record of the Twenty-Ninth IEEE Photovoltaic Specialists Conference, pp. 1410-1413, 2002.
Kern, "SunSine300: Manufacture of an AC Photovoltaic Module, Final Report, Phases I & II, Jul. 25, 1995-Jun. 30, 1998," NREL/SR-520-26085, 1999, 32 pages.

(56) References Cited

OTHER PUBLICATIONS

Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.

Khajehoddin et al., "A Novel Topology and Control Strategy for Maximum Power Point Trackers and Multi-string Grid-connected PV Inverters," Applied Power Electronics Conference, APEC08, pp. 173-178, 2008.

Khajehoddin et al., "A Robust Power Decoupler and Maximum Power Point Tracker Topology for a Grid-Connected Photovoltaic System," IEEE Power Electronics Specialists Conference, PESC08, pp. 66-69, 2008.

Kim et al., "New Control Scheme for AC-DC-AC Converter Without DC Link Electrolytic Capacitor," 24th Annual IEEE Power Electronics Specialists Conference, PESC '93 Record., pp. 300-306, 1993.

Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the Photoenergy™ Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

International Search Report and Written Opinion of the International Searching Authority for International Patent Application No. PCT/US2011/055685, Apr. 3, 2012, 13 pages.

* cited by examiner

SYSTEM AND METHOD FOR ESTABLISHING COMMUNICATION WITH AN ARRAY OF INVERTERS

TECHNICAL FIELD

The present disclosure relates, generally, to power converters for converting direct current (DC) power to alternating current (AC) power and, more particularly, to systems and methods for controlling and communicating with such power converters.

BACKGROUND

Power inverters convert a DC power to an AC power. For example, some power inverters are configured to convert the DC power to an AC power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency.

In an effort to increase the amount of AC power generated, a large number of power inverters may be used in a particular application. In some implementations, each power inverter is incorporated or otherwise associated with an alternative energy source to form an alternative energy source module. Such modules are typically located in remote or otherwise difficult to reach location (e.g., a solar cell panel located on a roof). As such, communicating with and/or controlling the inverters may be accomplished remotely. However, in many implementations, the identity and number of inverters used is unknown and/or may change over time thereby increasing the difficulty of establishing and maintaining communication and control of the inverters.

SUMMARY

According to on aspect, a method for establishing communication with a plurality of inverters, which may be configured to convert direct current (DC) power generated from an alternative source to alternating current (AC) power, may include determining an initial length of a response time window. The method may also include broadcasting a response request to each inverter of the plurality of inverters that prompts the inverter to respond. The response request may include the length of the response time window. Additionally, the method may include, in response to receiving a response from at least one inverter during the response time window, (i) recording an identification of the at least one inverter and (ii) transmitting an acknowledgement to the at least one inverter using the identification. Further, the method may include, in response to the response time window expiring, (i) adjusting the length of the response time window and (ii) broadcasting another response request that includes the adjusted length of the response time window to each inverter of the plurality of inverters.

In some embodiments, determining the initial length of the response time window may include determining the initial length based on a predetermined length of time required by an inverter of the plurality of inverters to transmit a response to the response request. Additionally, in some embodiments, determining the initial length of the response time window may include determining an initial length of the response time window that is a multiple of the predetermined length of time required by the inverter to transmit the response to the response request. Additionally, broadcasting the response request may include broadcasting the response request over an AC power line using a power line communication protocol.

Additionally, in some embodiments, receiving a response from the at least one inverter may include receiving a response that includes an identification number that uniquely identifies the responding inverter from the other inverters of the plurality of inverters and facilitates directed communication with the responding inverter using the identification number. Further, transmitting the acknowledgement to the at least one inverter may include transmitting the acknowledgement after expiration of the time window. Additionally, in some embodiments, adjusting the length of the response time window may include decreasing the length of the response time window by a multiple of a predetermined length of time required by an inverter of the plurality of inverters to transmit a response to the response request. Further, in some embodiments, adjusting the length of the response time window may include increasing the length of the response time window in response to a number of communication collisions during the response time window being greater than a predetermined value.

Additionally, the method may include incrementing a counter in response to not receiving a response from at least one inverter of the plurality of inverters during the response time window. In such embodiments, broadcasting another response request may include broadcasting another response request in response to the counter being less than a maximum threshold value. Additionally, in some embodiments, the method may further include stopping the broadcast of response requests in response to the counter being equal to a maximum threshold value. Alternatively, in some embodiments, the method may include incrementing a counter in response to not receiving a response from at least one inverter of the plurality of inverters during the time window and repeating the adjusting step, the broadcasting another response step, and the incrementing step until the counter equals a predetermined threshold value.

According to another aspect, a controller for communicating with a plurality of inverters over an alternating current (AC) power line may include a communication circuit, a processor communicatively coupled to the communication circuit, and a memory communicatively coupled to the processor. The inverters may be configured to convert direct current (DC) power from an alternative energy source to AC power. The communication circuit may be configured to communicate with the plurality of inverters over the AC power line using a power line communication protocol. The memory may have stored therein a plurality of instructions, which when executed by the processor, result in the processor determining an initial length of a response time window. Additionally, the plurality of instructions may result in the processor broadcasting, using the communication circuit, a response request to each inverter of the plurality of inverters that prompts the inverter to respond, the response request including the length of the response time window. Further, in response to receiving a response from at least one inverter during the response time window, the plurality of instructions may result in the processor (i) storing an identification of the at least one inverter in the memory and (ii) transmitting an acknowledgement, using the communication circuit, to the at least one inverter using the identification. Yet further, in response to the response time window expiring, the plurality of instructions may result in the processor (i) adjusting the length of the response time window and (ii) broadcasting another response request, using the communication circuit, that includes the adjusted length of the response time window to each inverter of the plurality of inverters.

In some embodiments, determining the initial length of the response time window may include determining the initial length based on a predetermined length of time required by an inverter of the plurality of inverters to transmit a response to the response request. Additionally, in some embodiments, adjusting the length of the response time window may include decreasing the length of the response time window by a multiple of a predetermined length of time required by an inverter of the plurality of inverters to transmit a response to the response request. Further, in some embodiments, the plurality of instructions may further result in the processor incrementing a counter in response to not receiving a response from at least one inverter of the plurality of inverters during the response time window. In such embodiments, broadcasting another response request may include broadcasting another response request in response to the counter being less than a maximum threshold value.

In some embodiments, the plurality of instructions further may result in the processor stopping the broadcast of response requests in response to the counter being equal to a maximum threshold value. Additionally, in some embodiments, the plurality of instructions further result in the processor incrementing a counter in response to not receiving a response from at least one inverter of the plurality of inverters during the time window and repeating the adjusting step, the broadcasting another response step, and the incrementing step until the counter equals a predetermined threshold value.

According to a further aspect, a method for establishing communication between a controller and a plurality of inverters, which may be configured to convert direct current (DC) power from an alternative energy source to AC power, may include receiving with an inverter a response request transmitted by the controller, the response request including a length of a response time window. Additionally, the method may include determining a random response time for the inverter based on the length of the response time window and transmitting a response to the controller at the response time. The response may include an identification of the inverter. The method may also include, in response to receiving an acknowledgement from the controller in response to the transmitted response, ignoring subsequent response requests from the controller.

In some embodiments, receiving a response request may include receiving a response request that was broadcast from the controller over an alternating current (AC) power line using a power line communication protocol. Additionally, determining a response time may include determining a response time that is within the response time window. For example, in some embodiments, determining a random response time may include determining a random response time that is a multiple of the length of time required by the inverter to transmit a response to the response request to the controller.

In some embodiments, ignoring subsequent response requests may include ignoring subsequent response requests from the controller for a predetermined amount of time. Additionally or alternatively, ignoring subsequent response requests may include ignoring subsequent response requests from the controller until a communication from the controller is received that instructs the inverter to stop ignoring subsequent response requests. In some embodiments, the method may further include, in response to (i) not receiving an acknowledgement from the controller in response to the transmitted response and (ii) receiving a subsequent response request from the controller that includes a length of a subsequent response time window, determining a subsequent response time for the inverter based on the length of the subsequent response time window and transmitting a response to the controller at the response time, the response including the identification of the inverter.

According to yet another aspect, an inverter to convert direct current (DC) power from an alternative energy source to alternating current (AC) power may include a communication circuit, a processor communicatively coupled to the communication circuit, and a memory device communicatively coupled with the processor. The communication circuit may be configured to communicate with a controller over an AC power line using a power line communication protocol. The memory device may include therein a plurality of instructions, which when executed by the processor, result in the processor receiving a response request transmitted by the controller over the AC power line. The response request may include a length of a response time window. The plurality of instructions may also result in the processor determining a random response time for the inverter based on the length of the response time window and transmitting a response to the controller at the response time. The response may include an identification of the inverter. The plurality of instructions may further result in the processor, in response to receiving an acknowledgement from the controller in response to the transmitted response, ignoring subsequent response requests from the controller.

In some embodiments, receiving a response request may include receiving a response request that was broadcast from the controller over an alternating current (AC) power line using a power line communication protocol. Additionally, determining a random response time may include determining a random response time that is a multiple of the length of time required by the inverter to transmit a response to the response request to the controller. Further, in some embodiments, ignoring subsequent response requests may include ignoring subsequent response requests from the controller for a predetermined amount of time. Additionally or alternatively, ignoring subsequent response requests may include ignoring subsequent response requests from the controller until a communication from the controller is received that instructs the inverter to stop ignoring subsequent response requests. Further, in some embodiments, the plurality of instructions may also result in the processor, in response to (i) not receiving an acknowledgement from the controller in response to the transmitted response and (ii) receiving a subsequent response request from the controller that includes a length of a subsequent response time window, determining a subsequent response time for the inverter based on the length of the subsequent response time window and transmitting a response to the controller at the response time, the response including the identification of the inverter.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
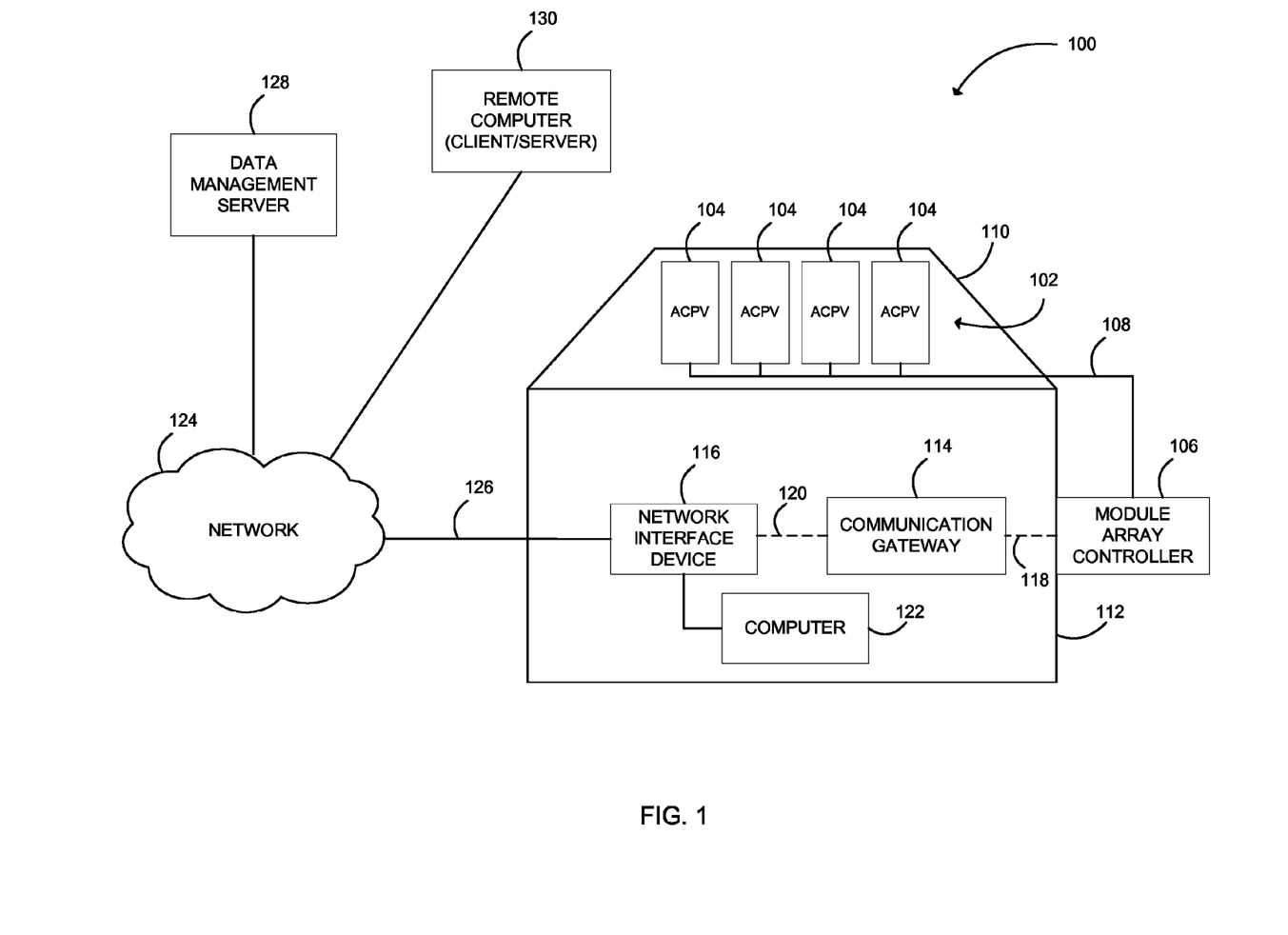
FIG. 1 is a simplified block diagram of one embodiment a system for generating alternative energy.

Referring to FIG. 1, in one embodiment, a system 100 for generating alternative energy includes an array 102 of alternative energy source modules 104 and a module array controller 106 electrically coupled to each alternative energy source module 104 via an alternating current ("AC") power line(s) 108. The alternative energy source modules 104 are configured to convert direct current ("DC") power from an alternative energy source to AC power, which may be supplied to a load (e.g., the utility grid) via the power line(s) 108. In the illustrative embodiment, the alternative energy source modules 104 are embodied as photovoltaic modules configured to convert solar energy to AC power. However, in other embodiments, other types of alternative energy sources may be used such as, for example, fuel cells, DC wind turbines, DC water turbines, and/or other alternative energy sources. Additionally, although the illustrative array 102 includes four alternative energy source modules 104, the array 102 may include more or less modules 104 in other embodiments.

The array 102 of alternative energy source modules 104 is located remotely from the module array controller 106. For example, in the illustrative embodiment, the array 102 is attached to a roof 110 of a building 112, such as a residential home, apartment, business, or other structure. Of course, in other embodiments, the array 102 may be positioned in other locations depending on, for example, the type of alternative energy used. Additionally, the alternative energy source modules 104 may or may not be located near each other. For example, the array 102 may be embodied as a plurality of sub-arrays, each located apart from each other and having a plurality of alternative energy source modules 104. Additionally, although a single AC power line 108 is illustrated as coupling the modules 104 to the controller 106 in FIG. 1, it should be appreciated that the AC power line 108 may be embodied as a plurality of AC power lines in other embodiments.

The system 100 may also include a communication gateway 114 and a network interface device 116 in some embodiments. In the illustrative embodiment, the communication gateway 114 is embodied as a wireless communication device configured to communicate with the module array controller 106 via a wireless communication link 118. The controller 106 and the wireless communication link 118 may use any suitable wireless communication protocol to effect such communication. For example, in one embodiment, the controller 106 is configured to communicate with the communication gateway 114 using a ZigBee communication protocol. Of course, other wireless communication protocols may be used in other embodiments. Additionally, in some embodiments, the controller 106 and the communication gateway 114 may be configured to communicate using a wired communication protocol over a wired communication link (i.e., the communication link 118 is a wired communication link in such embodiments).

The communication gateway 114 is also configured to communicate with a network interface device 116 via a communication link 120. The communication link 120 may be embodied as a wired or wireless communication link, and the communication gateway 114 may be configured to communicate with the network interface device 116 using a wired or wireless communication protocol. For example, in the illustrative embodiment, the communication gateway 114 is configured to communicate with the network interface device 116 using a ZigBee communication protocol.

The network interface device 116 is illustratively embodied as a data router, but may be embodied as other networking or communication routing devices in other embodiments. The network interface device 116 allows various computing devices to communicate with or otherwise receive data from the module array controller 106. For example, in some embodiments, the system 100 may include a computer 122 communicatively coupled to the network interface device 116. In such embodiments, a user (e.g., a homeowner) may use the computer 122 to interact with and/or receive data from the module array controller 106. The computer 122 may be embodied as any type of computing device such as a desktop computer, a laptop computer, a mobile computing device, a "smart" phone, or other device capable of communicating with the network interface device 116.

In some embodiments, the network interface device 116 is also communicatively coupled to a network 124 via a communication link 126, which may be embodied as a wired and/or wireless communication link. The network 124 may be embodied as any number of various wired and/or wireless networks. For example, the network 124 may be embodied as or otherwise include one or more local area networks, wide area networks publicly available global networks (e.g., the Internet), or any combination thereof. Furthermore, the network 124 may include any number of additional devices to facilitate remote communication with the network interface device 116 and may support any wired and/or wireless communication protocol.

In some embodiments, the system 100 may further include remote computing devices configured to remotely communicate with the module array controller 106 and/or other devices of the system 100. For example, the illustrative system 100 includes a data management server 128, which may be configured to receive data from the module array controller 106 via the network 124. Such data may include, for example, power generation data, service/maintenance data, error data, and/or any other data related to the alternative energy source modules 104. The data management server 128 may be embodied as any type of computer server and may include any number of computers, databases, networking equipment, and/or other computing devices.

The system 100 may also include other remote computers 130, which may operate as clients and/or servers in the system 100. For example, the remote computers 130 may be operated by alternative energy source module installation companies to control, monitor, and/or communicate with the module array controller 106. In this way, the installation company can monitor the performance and "health" of the alternative energy source modules 104 and controller 106. Additionally, such computers 130 may communicate with the data management server 128 to request additional data related to the system 100.

Figure 2:
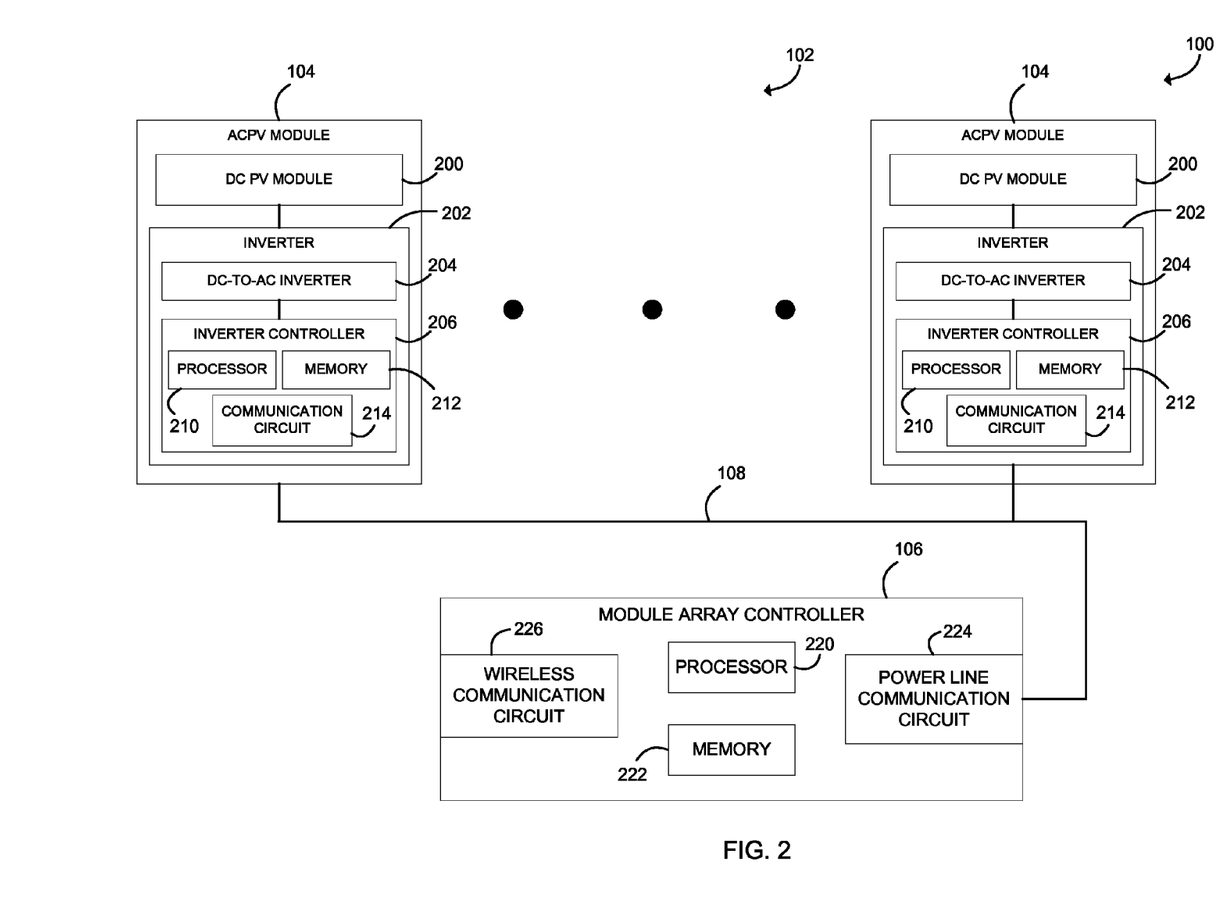
FIG. 2 is a simplified block diagram one embodiment of an alternative energy source module array and an alterative energy module array controller of the system of FIG. 1.

Referring now to FIG. 2, as discussed above, the illustrative alternative energy source modules 104 are embodied as photovoltaic modules configured to convert solar energy to AC power. Each of the modules 104 includes a DC photovoltaic module 200 and an inverter 202. The DC photovoltaic module 200 may be embodied as one or more photovoltaic cells and is configured to deliver DC power to the inverter 202 in response to receiving an amount of sunlight. Of course, the DC power delivered by DC photovoltaic module 200 is a function of environmental variables, such as, e.g., sunlight intensity, sunlight angle of incidence and temperature. The inverter 202 is configured to convert the DC power generated by the DC photovoltaic module 200 to AC power. In some embodiments, the inverter 202 and the DC photovoltaic module 200 are located in a common housing. Alternatively, the inverter 202 may include its own housing secured to the housing of the DC photovoltaic module 200. Additionally, in some embodiments, the inverter 202 is separate from the housing of the DC photovoltaic module 200, but located nearby.

The illustrative inverter 202 includes a DC-to-AC inverter 204 and an inverter controller 206. The DC-to-AC inverter 204 is configured to convert the DC power generated by the DC photovoltaic module 200 to AC power at the grid frequency. One of a number of various inverter topologies and devices may be used in the DC-to-AC inverter 204. Examples of inverter topologies that may be used in the inverter 204 are described in, for example, U.S. patent application Ser. No. 12/563,499, entitled "Apparatus for Converting Direct Current to Alternating Current" by Patrick L. Chapman et al., filed on Sep. 21, 2009 and in U.S. patent application Ser. No. 12/563,495, entitled "Apparatus and Method for Controlling DC-AC Power Conversion" by Patrick L. Chapman et al., filed on Sep. 21, 2009.

The operation of the inverter 204 is controlled and monitored by the inverter controller 206. The illustrative inverter controller 206 includes a processor 210, a memory 212, and a communication circuit 214. Additionally, the inverter controller 206 may include other devices commonly found in controllers, which are not illustrated in FIG. 2 for clarity of description. Such additional devices may include, for example, peripheral devices, data storage devices, input/output ports, and/or other devices.

The processor 210 of the inverter controller 206 may be embodied as any type of processor capable of executing software/firmware, such as a microprocessor, digital signal processor, microcontroller, or the like. The processor 210 is illustratively embodied as a single core processor, but may be embodied as a multi-core processor having multiple processor cores in other embodiments. Additionally, the inverter controller 206 may include additional processors 210 having one or more processor cores in other embodiments.

The memory 212 of the inverter controller 206 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 212 is communicatively coupled to the processor 210 via a number of signal paths, such as a data bus. Although only a single memory device 212 is illustrated in FIG. 2, in other embodiments, the inverter controller 206 may include additional memory devices. Various data and software may be stored in the memory device 212. For example, applications, programs, libraries, and drivers that make up the firmware executed by the processor 210 may reside in memory 212.

The communication circuit 214 may be embodied as any number of devices and circuitry for enabling communications between the inverter 202 and the controller 106. In the illustrative embodiment, the communication circuit 214 is configured to communicate with the controller 106 over the AC power line(s) 108 and may use any suitable power line communication protocol to effect such communication. For example, in some embodiments, the communication circuit 214 may use the CENELEC B band power line communication protocol but may use other protocols in other embodiments such as those protocols including a form of error detection and/or correction. Alternatively, in other embodiments, the communication circuit 214 may be configured to communicate with the controller 106 using a wired or wireless communication protocol. In such embodiments, the system 100 includes a suitable communication link (e.g., a dedicated communication cable) between each inverter 202 and the controller 106.

As discussed above, the module array controller 106 is configured to monitor and/or control the operation of the alternative energy source modules 104. The illustrative module array controller 106 includes a processor 220, a memory 222, and a communication circuit 224. Additionally, the module array controller 106 may include other devices commonly found in controllers, which are not illustrated in FIG. 2 for clarity of description. Such additional devices may include, for example, peripheral devices, data storage devices, input/output ports, and/or other devices.

The processor 220 of the module array controller 106 may be embodied as any type of processor capable of executing software/firmware, such as a microprocessor, digital signal processor, microcontroller, or the like. The processor 220 is illustratively embodied as a single core processor, but may be embodied as a multi-core processor having multiple processor cores in other embodiments. Additionally, the module array controller 106 may include additional processors 220 having one or more processor cores in other embodiments.

The memory 222 of the module array controller 206 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 222 is communicatively coupled to the processor 220 via a number of signal paths, such as a data bus. Although only a single memory device 222 is illustrated in FIG. 2, in other embodiments, the module array controller 106 may include additional memory devices. Various data and software may be stored in the memory device 222. For example, applications, programs, libraries, and drivers that make up the software/firmware executed by the processor 220 may reside in memory 222.

Similar to the communication circuit 214, the communication circuit 224 may be embodied as any number of devices and circuitry for enabling communications between the controller 106 and the inverter 202. In the illustrative embodiment, the communication circuit 224 is configured to communicate with the inverter 202 over the AC power line(s) 108 and may use any suitable power line communication protocol to effect such communication. For example, in some embodiments, the communication circuit 224 may use the CENELEC B power line communication protocol but may be use other protocols in other embodiments such as those protocols including a form of error detection and/or correction. Alternatively, as discussed above, the communication circuit 224 may be configured to communicate with the inverter 202 using a wired or wireless communication protocol.

In some embodiments, the module array controller 106 may also include a wireless communication circuit 226. In such embodiments, the wireless communication circuit 226 may be embodied as any number of devices and circuitry to facilitate communication between the controller 106 and the network interface device 116 over the communication link 120. To do so, the communication circuit 226 may use any suitable wireless communication protocol, such as a ZigBee communication protocol. Of course, as discussed above in regard to FIG. 1, the communication circuit 226 may be configured to communicate with the network interface device 116 using a wired communication protocol and hardware. In such embodiments, the communication link 120 is embodied as or otherwise includes a wired communication link.

Figure 3:
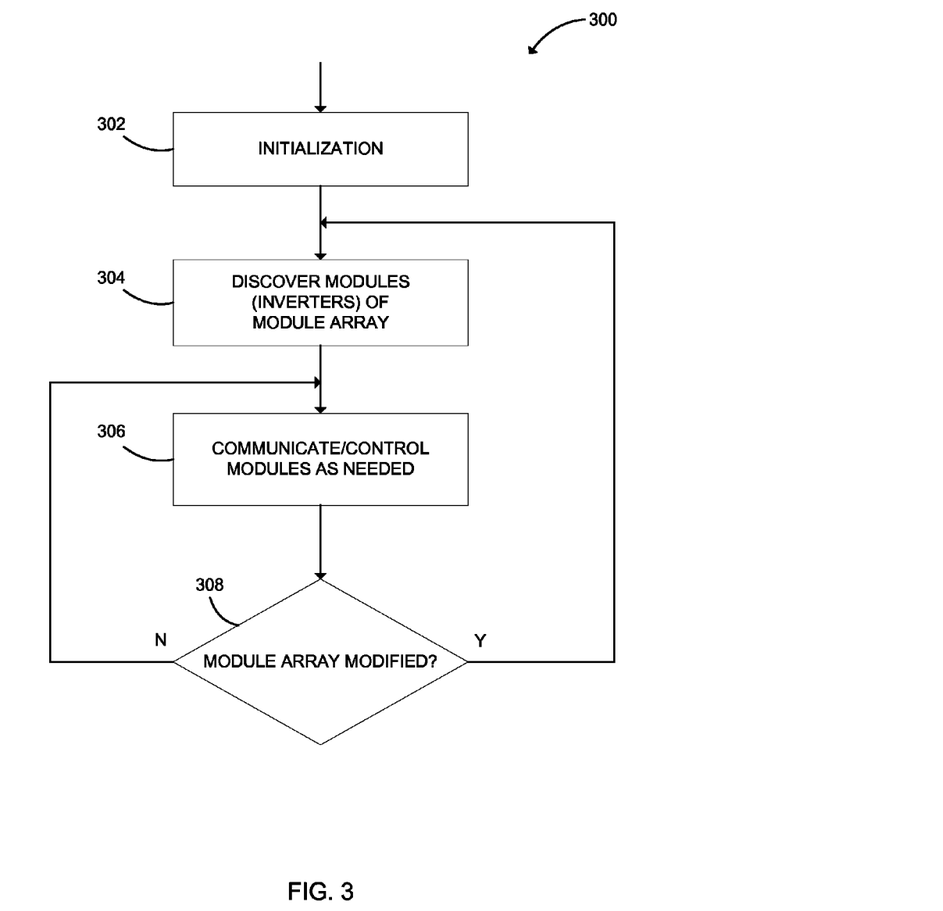
FIG. 3 is a simplified flow diagram of one embodiment of a method for establishing communications with an array of alternative energy modules.

As discussed above, in use, the module array controller 106 is configured to establish communications with each of the inverters 202 of the array 102 of alternative energy source modules 104. However, the controller 106 may not know the number of inverters 202 (i.e., the number of modules 104) or the identification (e.g., the media access control (MAC) address or other number/data required to directly communicate with each inverter 202) of each inverter 202 of the array 102. As such, the controller 106 may execute a method 300 for establishing communications with the inverters 202 as illustrated in FIG. 3. The method 300 begins with block 302 in which the controller 106 performs various initialization procedures. Such initialization procedures may include initialization of registers and devices, loading of firmware and software, and/or other procedures required to configure the controller 106 for communicating with the inverters 202.

In block 304, the controller 106 performs a discovery process to identify each inverter 202 of the array 102 and obtain the information necessary to directly communicate with each inverter 202. After the discovery process is completed, the controller 106 communicates and/or controls the operation of the modules 104 (i.e., inverters 202) in block 306 as needed. It should be appreciated that during use, modules 104 may be added or removed from the array 102. For example, if a module 104, or a component of the module 104, becomes defective, the module 104 or component thereof (e.g., inverter 202) may be replaced. Additionally, based on the change of power requirements, modules 104 may be added or removed from the array 102 over time. As such, the controller 106 determines if the module array has been modified in block 308. If so, the method 300 loops back to block 304 wherein the controller 106 performs the discovery process again to determine the identity of each module 104 (i.e., inverter 202). If not, the method 300 loops back to block 306 wherein the controller 106 continues to communicate with the modules 104 as needed. The controller 106 may determine that the array 102 has been modified based on a direct input supplied to the controller 106 (e.g., an installer informing the controller 106 that a module 104 has been added), based on a failure to communicate with one or more modules 104, or based on some other criteria.

Figure 4:
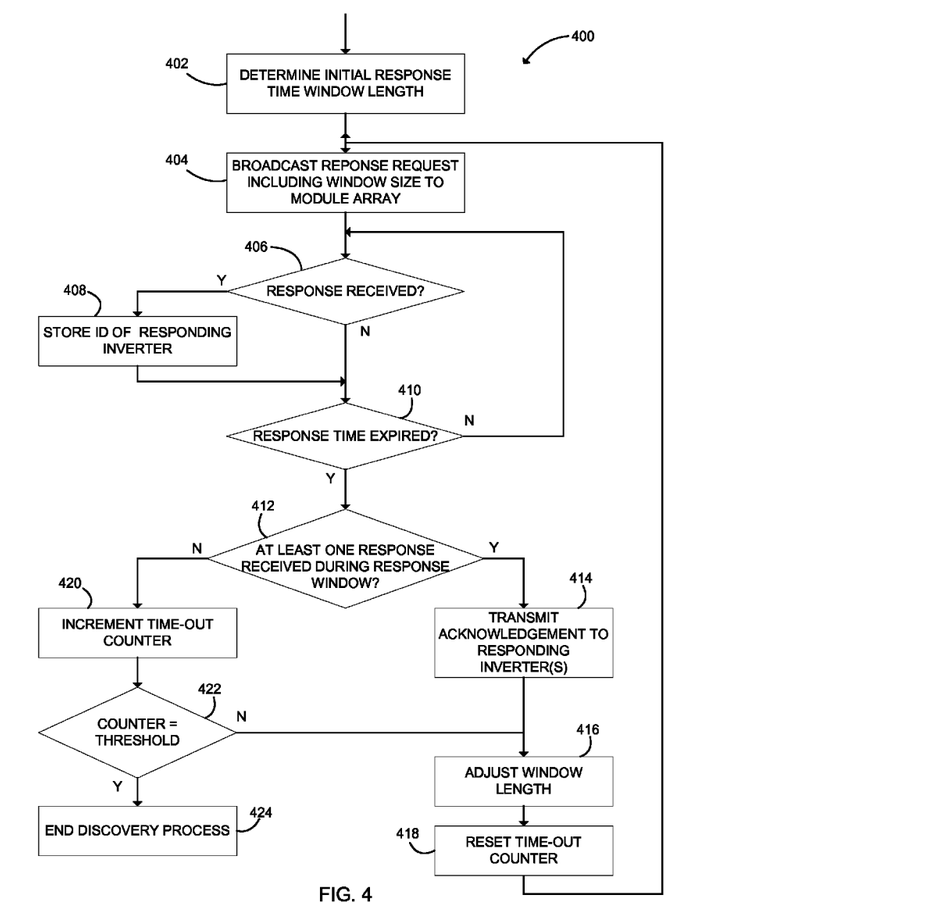
FIG. 4 is a simplified flow diagram of one embodiment of a method for discovering the alternative energy modules of the alternative energy module array of FIG. 2.

Referring now to FIG. 4, one embodiment of a method 400 for discovering each inverter 202 of the array 102, which may be used by the controller 106 in the discovery process of block 304 of method 300, is shown. The method 400 begins with block 402 in which the controller 106 determines an initial response time window length. The response time window represents a length of time during which the inverters 202 of the modules 104 may respond to a response request transmitted by the controller 106 as discussed in more detail below. The controller 106 may use any suitable algorithm to determine the initial length of the response time window. In one particular embodiment, the controller 106 is configured to determine the length of the response time window based on the length of time required for an inverter 202 to transmit the response to the controller 106 multiplied by the expected maximum number of modules 104 in the array 102. For example, if the inverter 202 requires 500 milliseconds to transmit the response to the controller 106 and the expected maximum number of modules 104 in the array 102 is determined to be 200, the controller 106 may set the initial length of the response time window to about 100 seconds (i.e., 500 milliseconds*200 modules). The length of time required by the inverter 202 to transmit the response to the controller 106 may be based on or otherwise affected by the communication protocol used, the communication circuitry used, the data size of the response, and/or other parameters. The expected maximum number of modules 104 in the array 102 may be an arbitrary maximum number or based on an estimated maximum size of the array 102 (e.g., based on a maximum physical and/or electrical capacity). Alternatively, in other embodiments, the controller 106 may be configured to simply use an arbitrary, large length of time for the initial response time window.

In block 404, the controller 106 broadcasts a response request, which is received by each of the inverters 202. The response request includes the length of the response time window determined in block 406. The response request prompts each of the inverters 202 to respond to the request by transmitting identification data related to the respective inverter 202 to the controller 106. In block 406, the controller 106 determines whether a response has been received from one of the inverters 202 in response to the response request. If so, the controller 208 records the identification data received in the response from the inverter 202. For example, the controller 208 may store the identification data in the memory 222 or other storage device. As discussed in more detail below, the identification data uniquely identifies the inverter 202 from the other inverters of the array 102 and allows the controller 208 to directly communicate with the responding inverter 202 (e.g., the identification data may include a MAC address associated with the responding inverter 202).

In block 410, the controller 106 determines whether the response time window has expired. If not, the method 400 loops back to block 406 wherein the controller 106 again monitors for responses from the inverters 202. However, if the controller 106 determines that the response time window has expired in block 410, the controller 106 determines if at least one response was received from an inverter 202 in the last response time window in block 412. If so, the controller 106 transmits an acknowledgment to each of the responding inverters 202 in block 414. The acknowledgment may be embodied as any type of communication capable of informing the responding inverters 202 that the controller 106 has received their respective responses. As discussed in more detail below in regard to FIG. 5, the acknowledgement may also prompt the responding inverters 202 to ignore subsequent response requests from the controller 106.

Subsequently, in block 416, the controller 106 adjusts the length of the response time window. In some embodiments, the controller 106 is configured to decrease the length of the response time window in block 416. For example, the controller 106 may be configured to decrease the length of the response time window by a predetermined multiple of the length of time required by an inverter 202 to transmit a response to the response request. For example, in the example described above, the controller 106 may be configured to decrease the response time window by a multiple of 500 milliseconds (e.g., 500 ms, 1000 ms, 1500 ms, etc.), which was the length of time required for an inverter 202 to respond. In some embodiments, a minimum response time window length may be used if the adjusted would reduce the length of the response time window below a minimum length.

In other embodiments, the controller 106 may decrease the response window time by an arbitrary, predetermined amount. Additionally, in some embodiments, the adjustment made to the response time window in block 416 may be based on other criteria. For example, the adjustment may be based on the number of data collisions detected by the controller 106 in the previous response time window or on the expected remaining number of non-responding inverters 202. In such embodiments, the length of the response time window may be decreased, may be increased, or may remain the same.

In block 418, the controller 106 resets a time-out counter. As discussed below in more detail, the time-out counter is used to estimate when all of the inverters 202 of the array 102 have been discovered and responded to the controller 106. As such, if at least one response was received in the current response time window, the controller 106 resets the time-out counter in block 418. After the time-out counter is reset in block 418, the method 400 loops back to block 404 in which the controller 106 broadcasts another response request, which includes the adjusted response time window length.

Referring back to block 412, if the controller 106 determines that no response was received from any inverters 202 in the current response time window, the method 400 advances to block 420. In block 420, the controller 106 increments the time-out counter. As discussed above, the time-out counter is used to estimate when all of the inverters 202 of the array 102 have been discovered. As such, in block 422, the controller 106 determines if the time-out counter is equal to a predetermined threshold value. If not, the method 400 advances to block 416 in which the response time window length is adjusted. However, if the time-out counter is determined to be equal to the predetermined threshold value in block 422, the controller 106 determines that all of the inverters 202 of the array 102 have been discovered and ends the discovery process in block 424. In one particular embodiment, the predetermined threshold value is set to three. As such, the controller 106 will continue to broadcast response requests until no response is received from an inverter 202 in three consecutive response time windows. Of course, other values for the predetermined threshold value may be used in other embodiments.

Figure 5:
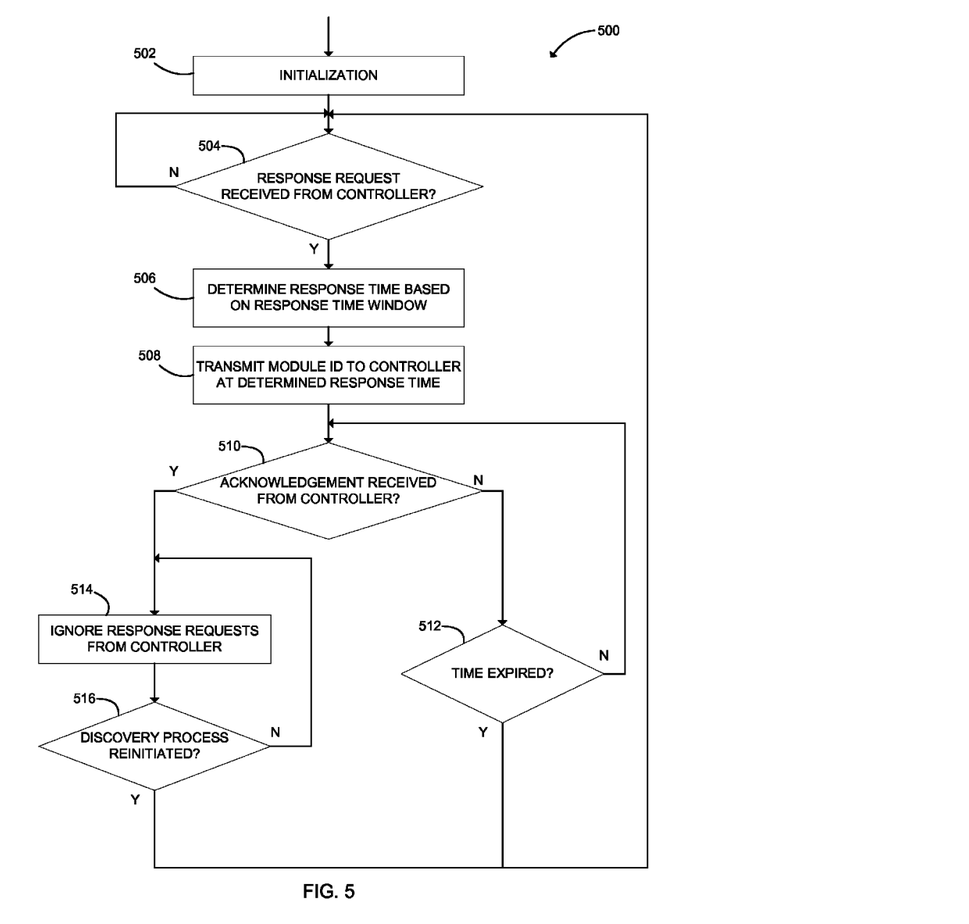
FIG. 5 is a simplified flow diagram of one embodiment of a method for establishing communication with the alternative energy module array controller of FIG. 2

Referring now to FIG. 5, each of the inverters 202 of the modules 104 of the array 102 may execute a method 500 for establishing communication with the alternative energy module array controller 106. The method 500 begins with block 502 in which the inverter 202 performs various initialization procedures. Such initialization procedures may include initialization of registers and devices, loading of firmware and software, and/or other procedures required to configure the inverter 202 for communicating with the controller 106. Subsequently, in block 504, the inverter 202 determines whether a response request was received from the controller 106. As discussed above in regard to FIG. 4, the response request is broadcast by the controller 106 and, as such, received by each inverter 202. If no response request has been received, the method 500 loops back to block 504 in which the inverter 202 continues to monitor for a broadcast from the controller 106.

If, however, the inverter 202 receives a response request from the controller 106 in block 504, the inverter 202 determines a response time to respond to the response request in block 506. The response time is based on the length of the response time window, which is included in the response request received from the controller 106. In the illustrative embodiment, the inverter 202 is configured to randomly determine a response time within the response time window at which to send its response to the controller 106. Such response times may be multiples of the length of time required by the inverter 202 to send the response to the controller 106. For example, returning to the previous example, the response time determine by the inverter 202 in block 506 may be a random integer multiple of 500 ms, which was the estimated time to transmit the response to the controller 106. In this way, each of the inverters 202 randomly selects a timeslot of the response time window in which to send its response to the controller 106. As such, the responses from the inverters 202 are spread across the response time window, thereby reducing the likelihood of communication collisions.

In block 508, the inverter 202 transmits a response to the controller 106 at the response time determined in block 506. As discussed above, the response includes identification data that uniquely identifies the responding inverter 202 from the other inverters 202 of the array 102. Additionally, the identification data may be used by the controller 106 to send direct communications (e.g., a unicast) to the responding inverter 202. For example, the identification data may include the MAC address of the responding inverter 202.

After the inverter 202 has transmitted its response in block 508, the inverter 202 determines if an acknowledgment has been received from the controller 106 in block 510. If no acknowledgement has been received, the inverter 202 determines if a wait period has expired in block 512. If not, the inverter 202 continues to monitor for an acknowledgement from the controller 106 in blocks 510, 512 until an acknowledgment is received or the wait period expires. The wait period may be an arbitrary wait period, based on the response window time, or some other criteria. After the wait period expires (or other wait period lapses) with no acknowledgment received, the method 500 loops back to block 504 in which the inverter continues to monitor for response requests from the controller 106.

Referring back to block 510, if an acknowledgement is received from the controller 106, the method 500 advances to block 514. In block 514, the inverter 202 ignores any subsequent response requests received from the controller 106. In this way, the amount of response traffic is reduced over time as the number of acknowledged inverters increases.

In some embodiments, the discovery process may be restarted at a later time. As such, the inverter 202 determines if the discovery process has been reinitiated in block 516. If not, the method 500 loops back to block 514 wherein the controller continues to ignore response requests from the controller 106. However, if the discovery process has been reinitiated in block 516, the method 500 loops back to block 504 in which the inverter continues to monitor for response requests from the controller 106. As discussed above, the discovery process may be reinitiated after a predetermined lapse of time, in response to the array 102 being modified, or based on some other criteria.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. A method for establishing communication with a plurality of inverters, each of the inverters being configured to convert direct current (DC) power generated from an alternative source to alternating current (AC) power, the method comprising:
   determining an initial length of a response time window;
   broadcasting the initial length of the response time window to each inverter of the plurality of inverters to prompt each inverter to respond with corresponding identification data;
   in response to receiving a response from at least one inverter during the response time window, (i) recording the identification data of the at least one inverter and (ii) transmitting an acknowledgement to the at least one inverter using the identification data; and
   in response to the response time window expiring, (i) adjusting the length of the response time window and (ii) broadcasting the adjusted length of the response time window to each inverter of the plurality of inverters.

2. The method of claim 1, wherein determining the initial length of the response time window comprises determining the initial length based on a predetermined length of time required by an inverter of the plurality of inverters to transmit a response to the broadcast.

3. The method of claim 2, wherein determining the initial length of the response time window comprises determining an initial length of the response time window that is a multiple of the predetermined length of time required by the inverter to transmit the response to the broadcast.

4. The method of claim 1, wherein broadcasting the initial length comprises broadcasting the initial length over an AC power line using a power line communication protocol.

5. The method of claim 1, wherein receiving a response from the at least one inverter comprises receiving a response that includes an identification number that uniquely identifies the responding inverter from the other inverters of the plurality of inverters and facilitates directed communication with the responding inverter using the identification number.

6. The method of claim 1, wherein transmitting the acknowledgement to the at least one inverter comprises transmitting the acknowledgement after expiration of the time window.

7. The method of claim 1, wherein adjusting the length of the response time window comprises decreasing the length of the response time window by a multiple of a predetermined length of time required by an inverter of the plurality of inverters to transmit a response to the broadcast.

8. The method of claim 1, wherein adjusting the length of the response time window comprises increasing the length of the response time window in response to a number of communication collisions during the response time window being greater than a predetermined value.

9. The method of claim 1, further comprising:
   incrementing a counter in response to not receiving a response from at least one inverter of the plurality of inverters during the response time window, and
   wherein broadcasting the adjusted length comprises broadcasting the adjusted length in response to the counter being less than a maximum threshold value.

10. The method of claim 9 further comprising stopping the broadcast of adjusted lengths in response to the counter being equal to a maximum threshold value.

11. The method of claim 1, further comprising:
   incrementing a counter in response to not receiving a response from at least one inverter of the plurality of inverters during the time window, and
   repeating the adjusting step, the broadcasting the adjusted length step, and the incrementing step until the counter equals a predetermined threshold value.

12. A controller for communicating with a plurality of inverters over an alternating current (AC) power line, the inverters configured to convert direct current (DC) power from an alternative energy source to AC power, the controller comprising:
   a communication circuit to communicate with the plurality of inverters over the AC power line using a power line communication protocol;
   a processor communicatively coupled to the communication circuit; and
   a memory communicatively coupled to the processor, the memory having stored therein a plurality of instructions, which when executed by the processor, result in the processor:
      determining an initial length of a response time window,
      broadcasting, using the communication circuit, the initial length of the response time window to each inverter of the plurality of inverters to prompt each inverter to respond with corresponding identification data,
      in response to receiving a response from at least one inverter during the response time window, (i) storing the identification data of the at least one inverter in the memory and (ii) transmitting an acknowledgement, using the communication circuit, to the at least one inverter using the identification data, and
      in response to the response time window expiring, (i) adjusting the length of the response time window and (ii) broadcasting, using the communication circuit, the adjusted length of the response time window to each inverter of the plurality of inverters.

13. The controller of claim 12, wherein determining the initial length of the response time window comprises determining the initial length based on a predetermined length of time required by an inverter of the plurality of inverters to transmit a response to the broadcast.

14. The controller of claim 12, wherein adjusting the length of the response time window comprises decreasing the length of the response time window by a multiple of a predetermined length of time required by an inverter of the plurality of inverters to transmit a response to the broadcast.

15. The controller of claim 12, wherein the plurality of instructions further result in the processor:

incrementing a counter in response to not receiving a response from at least one inverter of the plurality of inverters during the response time window, and wherein broadcasting the adjusted length comprises broadcasting the adjusted length in response to the counter being less than a maximum threshold value.

16. The controller of claim 15, wherein the plurality of instructions further result in the processor stopping the broadcast of adjusted lengths in response to the counter being equal to a maximum threshold value.

17. The controller of claim 12, wherein the plurality of instructions further result in the processor:

incrementing a counter in response to not receiving a response from at least one inverter of the plurality of inverters during the time window, and repeating the adjusting step, the broadcasting the adjusted length step, and the incrementing step until the counter equals a predetermined threshold value.

18. The controller of claim 12, wherein the identification data includes an identification number that uniquely identifies the responding inverter from the other inverters of the plurality of inverters and facilitates directed communication with the responding inverter using the identification number.

19. The controller of claim 12, wherein transmitting the acknowledgement to the at least one inverter comprises transmitting the acknowledgement after expiration of the response time window.

20. The controller of claim 12, wherein adjusting the length of the response time window comprises increasing the length of the response time window in response to a number of communication collisions during the response time window being greater than a predetermined value.

21. One or more non-transitory, machine-readable media comprising a plurality of instructions, which in response to execution by a controller communicatively coupled to a plurality of AC-to-DC inverters over an AC power line, cause the controller to:

determine an initial length of a response time window;

broadcast the initial length of the response time window to each inverter of the plurality of inverters to prompt each inverter to respond with corresponding identification data;

in response to receipt a response from at least one inverter during the response time window, (i) record the identification data of the at least one inverter and (ii) transmit an acknowledgement to the at least one inverter using the identification data; and in response to expiration of the response time window, (i) adjust the length of the response time window and (ii) broadcast the adjusted length of the response time window to each inverter of the plurality of inverters.

22. The one or more non-transitory, machine-readable media of claim 21, wherein to determine the initial length of the response time window comprises to determine the initial length based on a predetermined length of time required by an inverter of the plurality of inverters to transmit a response to the broadcast.

23. The one or more non-transitory, machine-readable media of claim 22, wherein to determine the initial length of the response time window comprises to determine an initial length of the response time window that is a multiple of the predetermined length of time required by the inverter to transmit the response to the broadcast.

24. The one or more non-transitory, machine-readable media of claim 22, wherein the identification data includes an identification number that uniquely identifies the responding inverter from the other inverters of the plurality of inverters and facilitates directed communication with the responding inverter using the identification number.

25. The one or more non-transitory, machine-readable media of claim 22, wherein to transmit the acknowledgement to the at least one inverter comprises to transmit the acknowledgement after expiration of the time window.

26. The one or more non-transitory, machine-readable media of claim 22, wherein to adjust the length of the response time window comprises to decrease the length of the response time window by a multiple of a predetermined length of time required by an inverter of the plurality of inverters to transmit a response to the broadcast.

27. The one or more non-transitory, machine-readable media of claim 22, wherein to adjust the length of the response time window comprises to increase the length of the response time window in response to a number of communication collisions during the response time window being greater than a predetermined value.

28. The one or more non-transitory, machine-readable media of claim 22, wherein the plurality of instructions further cause the controller to increment a counter in response to not receiving a response from at least one inverter of the plurality of inverters during the response time window, and wherein to broadcast the adjusted length comprises to broadcast the adjusted length in response to the counter being less than a maximum threshold value.

29. The one or more non-transitory, machine-readable media of claim 28, wherein the plurality of instructions further cause the controller to stop the broadcast of adjusted lengths in response to the counter being equal to a maximum threshold value.

30. The one or more non-transitory, machine-readable media of claim 22, wherein the plurality of instructions further cause the controller to:

increment a counter in response to not receiving a response from at least one inverter of the plurality of inverters during the time window, and repeat the adjustment step, the broadcast of the adjusted length step, and the increment step until the counter equals a predetermined threshold value.

* * * * *